United States Patent Office 3,364,175
Patented Jan. 16, 1968

3,364,175
POLYDIORGANOSILOXANES CURED WITH ALKOXYSILYL CARBAMATES
Joel F. Di Paola, Cohoes, N.Y., assignor to General Electric Company, a corporation of New York
No Drawing. Filed Oct. 20, 1966, Ser. No. 587,961
7 Claims. (Cl. 260—46.5)

ABSTRACT OF THE DISCLOSURE

A room temperature vulcanizing silicone rubber composition useful as a sealing, caulking and coating composition, stable under anhydrous conditions and curable to the solid elastic state upon exposure to moisture which comprises an alkoxysilyl carbamate and a liquid silanol chain-stopped polydiorganosiloxane.

---

This application relates to organopolysiloxanes which are stable under anhydrous conditions but which cure to the solid, elastic state upon exposure to moisture, such as moisture normally present in the atmosphere.

Room temperature curing or room temperature vulcanizing organopolysiloxanes of the moisture curing type are well known in the art and have received a ready commercial acceptance. Many of these materials are based on the use of an organoacyloxysilane, such as methyltriacetoxysilane, to cross-link a silanol chain-stopped polydiorganosiloxane. While these materials are extremely valuable, they offer several disadvantages. First, it is found that these products do not adhere as well as desired to a number of substrates, such as aluminum substrates. Second, it is found that the acid-by-products, typically acetic acid, of the cure mechanism sometimes cause corrosion of the materials surrounding the curing room temperature vulcanized silicone elastomer.

A number of solutions have been suggested to this problem, most of which are directed to alternative materials to the organotriacyloxysilanes. One class of alternative materials are the organosilyl tris-carbamates, which comprise one silicon-bonded monovalent hydrocarbon radical, halogenated monovalent hydrocarbon radical, or the like, and three tris-carbamate radicals obtained by reacting a tris-aminosilane with carbon dioxide. While these organosilyl tris-carbamates result in the curing of silanol chain-stopped polydiorganosiloxanes without the evolution of acidic by-products and while the cured compositions show improved adhesion to various surfaces such as aluminum, the use of such organosilyl tris-carbamates still presents one disadvantage. This disadvantage is based on the fact that the organosilyl tris-carbamates are solid materials which are quite difficult to dissolve in silanol chain-stopped polydiorganosiloxanes. This presents problems when attempts are made to form a uniform mixture of the organosilyl tris-carbamate with the silanol chain-stopped polydiorganosiloxane. To avoid such problems, it is usually necessary either to dissolve the organosilyl tris-carbamate in a solvent and then add the solution of the organosilyl tris-carbamate to the polydiorganosiloxane or it is necessary to form a powder of the organosilyl tris-carbamate and disperse it as well as possible into the silanol chain-stopped diorganopolysiloxane. In the first procedure, the problem remains of removing the solvent from the curable composition and in the second case it is found that uniform dispersion is very difficult, which sometimes leads to non-uniform curing of the polydiorganosiloxane.

The present invention is based on my discovery of an alternative to the use of organosilyl tris-carbamates which avoids the problems associated with the organosilyl tris-carbamates, but still obtains the benefits of the cure systems employing the carbamates. In particular, the present invention is based on my discovery of the use of alkoxysilyl tris-carbamates and alkoxysilyl bis-carbamates for the curing or cross-linking of polydiorganosiloxanes. These alkoxysilyl carbamates are thixotropic pastes and are readily soluble in the silanol chain-stopped polydiorgano-siloxane so that uniform dispersion of these materials in the polydiorganosiloxane is readily accomplished.

My invention, therefore, comprises a composition which is stable under anhydrous conditions but which is curable to the solid, elastic state upon exposure to moisture, which comprises an alkoxysilyl carbamate having the formula:

(1) 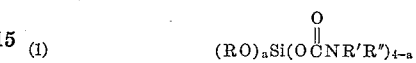

and a liquid silanol chain-stopped polydiorganosiloxane having the formula:

(2) $HO[(Y)_2SiO]_nH$ where R and R' are lower alkyl radicals, R'' is a member selected from the class consisting of hydrogen and lower alkyl radicals, and Y is a member selected from the class consisting of monovalent hydrocarbon radicals, halogenated monovalent hydrocarbon radicals, and cyanoalkyl radicals, $a$ is a whole number equal to from 1 to 2, inclusive, and $n$ has a value of at least 10, e.g., from about 10 to 10,000 or more.

Illustrative of the radicals represented by R, R' and R'' in Formula 1 are alkyl radicals containing from 1 to 7 carbon atoms, such as methyl, ethyl, propyl, tertiarybutyl, and heptyl. Illustrative of the radicals represented by Y in Formula 2 are alkyl radicals, e.g., methyl, ethyl, propyl, butyl, octyl, octadecyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; cycloaliphatic radicals, e.g. cyclohexyl, cycloheptyl, cyclohexenyl, etc. radicals; halogenated radicals, such as monovalent hydrocarbon radicals containing carbon-bonded halogen, e.g., chloromethyl, chlorophenyl, dibromophenyl, trifluoromethylpropyl, trifluoromethylphenyl, dibromomethylphenyl, bromohexyl, bromocyclohexenyl, etc. radicals; cyanoalkyl radicals, e.g., cyanomethyl, beta-cyanoethyl, beta-cyanopropyl, gamma-cyanopropyl, omega cyanobutyl, etc. radicals.

The alkoxysilyl carbamates of Formula 1 are prepared by reacting an alkoxychlorosilane having the formula:

(3) 

with an amine having the formula:

(4) $HNR'R''$ to produce an alkoxyaminosilane having the formula:

(5) 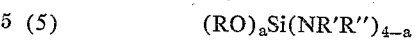

where R, R', R'', Y, $a$ and $n$ are as previously defined. The alkoxyaminosilane of Formula 5 is converted to the alkoxysilyl carbamate of Formula 1 by reaction of the alkoxyaminosilane with carbon dioxide. The dialkoxydiaminosilanes and alkoxytriaminosilanes employed as intermediates for the preparation of the dialkoxysilyl biscarbamates and alkoxysilyl tris-carbamates are known in the art and details of their preparation need not be described here. While the specific alkoxysilyl carbamates employed in the practice of the present invention are not generally known in the art, certain analogous compounds are described by H. Breederveld, Rec. Trav. Chim., 81, 276 (1962). The specific material therein described is the monocarbamate prepared from trimethyldiethylaminosilane. Alkoxysilyl carbamates having two or three different silicon-bonded carbamate groups are prepared from alkoxyaminosilanes having two or three different amino groups attached to silicon. For example, a suitable alkoxysilyl tris-carbamate can be prepared by reacting methoxytrichlorosilane with two moles each of ethylamine, n-propylamine, and n-butylamine, to produce the mixed methoxyamine, which is then reacted with carbon dioxide to produce the mixed tris-carbamate.

The description of the preparation of this carbamate illustrates the general criteria employed in the preparation of the various carbamates employed in the practice of the present invention. In particular, two moles of the desired amine are employed for each gram atom of silicon-bonded chlorine atoms in the alkoxychlorosilane of Formula 3. The reaction between the amine and the chlorosilane results in the replacement of one of the silicon-bonded chlorine groups with a silicon-bonded amino group and also results in the formation of the hydrochloride of the amine involved. The use of the carbon dioxide then converts the silicon-bonded amino group to a silicon-bonded carbamate group.

While the silanol chain-stopped polydiorganopolysiloxane of Formula 2 has been described with reference to a broad class of silicon-bonded organic groups, it is preferred that the radicals represented by Y in Formula 2 be either methyl or phenyl, with the preferred radical being methyl. Furthermore, it should be understood that the silanol chain-stopped liquid polydiorganosiloxane of Formula 3 can contain more than one type of Y group. For example, some of the Y groups can be methyl and others can be phenyl and/or cyanoethyl. When the products of this invention are prepared from liquid silanol chain-stopped polydiorganosiloxanes containing silicon-bonded cyanoalkyl radicals, it is preferred that the nitrile group be attached to silicon through at least two carbon atoms. Preferably, no more than about 10 mole percent of the silicon atoms contain silicon-bonded cyanoalkyl radicals. Also, it is preferred that at least 50 mole percent of the radicals represented by Y be methyl radicals.

Included among the liquid silanol chain-stopped polydiorganosiloxanes of Formula 2 are copolymers containing more than one type of diorganosiloxane unit. For example, included within the scope of Formula 2 are copolymers of dimethylsiloxane units and methylphenylsiloxane units; as well as copolymers of dimethylsiloxane units, methylphenylsiloxane units, and methylvinylsiloxane units. Likewise, it is possible that a mixture of liquid silanol chain-stopped polydiorganosiloxanes within the scope of Formula 2 can be employed. While the materials within the scope of Formula 2 have been described as polydiorganosiloxanes, it is to be understood that such materials can contain minor amounts, e.g., up to about 1% of monoorganosiloxane units or triorganosiloxane units in which the organo groups are of the same scope as defined for Y of Formula 2.

The silanol chain-stopped polydiorganosiloxanes employed in the practice of the present invention can vary from thin fluids up to viscous gums, depending upon the value of $n$ in Formula 2 and the nature of the particular organic groups attached to the silicon atom. Preferably, however, the silanol chain-stopped polydiorganosiloxane is selected to have a viscosity in the range of from about 100 centistokes to 100,000 centistokes when measured at 25° C.

The room temperature curing silicone compositions of the present invention are prepared by simply mixing the alkoxysilyl carbamate of Formula 1 with the liquid silanol chain-stopped polydiorganosiloxane of Formula 2. Because of the ready solubility of the alkoxysilyl carbamates in the polydiorganosiloxanes, the alkoxysilyl carbamate is usually added to the polydiorganosiloxane and after solution has been effected, the reaction mixture is merely stirred to insure a homogeneous solution. Because of the solubility of the alkoxysilyl carbamates in the liquid silanol chain-stopped polydiorganosiloxane, it is unnecessary to add any solvent to the reaction mixture.

The only precaution necessary during the addition of the alkoxysilyl carbamate is to keep the reaction mixture away from moisture, since moisture reacts very rapidly with the alkoxysilyl carbamates to decompose the carbamate groups into amines and carbon dioxide. Likewise, moisture reacts with the mixture of the alkoxysilyl carbamate and the silanol chain-stopped polydiorganosiloxane to cause curing to the silicone rubber state.

The amount of the alkoxysilyl carbamate added to the liquid silanol chain-stopped polydiorganosiloxane can vary within extremely wide limits. However, for best results it is preferred to add from 1 to 5 percent by weight of the alkoxysilyl carbamate of Formula 1 based on the weight of the silanol chain-stopped polydiorganosiloxane of Formula 2. No particular benefit is derived from employing more than about 5 percent by weight of the alkoxysilyl carbamate.

As previously mentioned, the room temperature curing organopolysiloxanes of the present invention are prepared by mixing the alkoxysilyl carbamate of Formula 1 with the silanol chain-stopped polydiorganosiloxane of Formula 2. As soon as the addition is completed, the composition is ready for conversion to the cured, solid, elastic state. This conversion is effected by exposing the composition to moisture normally present in the atmosphere. The time required to convert the material to the solid, cured, elastic state is a function of the particular silanol chain-stopped polydiorganosiloxane employed, the particular alkoxysilyl carbamate employed, the amount of such carbamate, and the temperature at which the mixture is maintained. For most systems, at a temperature of around room temperature, e.g., 20 to 25° C., the material cures to the non-tacky state within about 30 minutes and complete cure is generally accomplished in from 12 to 24 hours.

When the curing reaction is effected at or below room temperature, the rate of cure is sufficiently slow that the carbon dioxide diffuses from the reaction mass. Volatile amines can also diffuse from the reaction mass and evaporate. The fact that an amine and carbon dioxide are products of the curing reaction can be used to prepare sponge products by maintaining the reaction mixture at an elevated temperature during cure. For example, when a mixture of an alkoxysilyl carbamate of Formula 1 and a silanol chain-stopped polydiorganosiloxane of Formula 2 is maintained at a temperature of from about 45 to 80° C., the rate of cure is markedly increased and carbon dioxide and volatile amines generated cannot escape from the reaction mixture and, therefore, trapped gases cause the reaction mixture to sponge. This results in a cured silicone rubber sponge at the end of 1 to 2 hours at the elevated temperatures mentioned.

The compositions prepared mixing the alkoxysilyl carbamate and the silanol chain-stopped polydiorganosiloxane can be used without further modification in many sealing, caulking, and coating applications by merely placing the composition in the desired place and permitting it to cure. However, it is often desirable to modify the compositions of the present invention by incorporating various fillers or extenders therein to change various properties. Such fillers or extenders can be used to vary the color of the material, or to reduce the cost of the material. Illustrative of the many fillers which can be employed with compositions of the present invention are titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clays, asbestos, graphite, and carbon, as well as other organic materials, such as cork, cotton, and synthetic fibers.

When fillers are added to the compositions of the present invention, they are generally employed in amounts of from about 20 to 200 parts filler per 100 parts of the liquid silanol chain-stopped polydiorganosiloxane of Formula 2. The fillers are uniformly mixed with the polydiorganosiloxane and thereafter the alkoxysilyl carbamate of Formula 1 is added by methods previously described and the reaction mixture is allowed to cure. The presence of fillers in the compositions of the present invention has no significant effect on the rate of cure of such compositions.

The room temperature silicone rubber compositions of the present invention are particularly adapted for caulking and sealing applications where adhesion to various surfaces is important. For example, the materials are useful in household caulking applications and industrial applications, such as on buildings, factories, automotive equipment, and where adhesion to masonry, glass, plastic, metal and wood is required.

The following examples are illustrative of the practice of my invention and are not intended for purposes of limitation. All parts are by weight.

*Example 1*

The bis-carbamate of dimethoxydi(isopropylamino) silane was prepared by adding 161 parts of isopropylamine to 100 parts of dimethoxydichlorosilane in 1500 parts dry toluene at 90° C. The reaction mixture was then refluxed and fractionally distilled to yield 96 parts of the dimethoxydi(isopropylamino)silane, which had a boiling point of 76 to 78° C. at 10 mm. The identity of this material was confirmed by analysis which showed the presence of 13.30% nitrogen, as compared with the theoretical value of 13.58%. This material was converted to the carbamate by adding 20 parts of this product to a reaction vessel protected from the atmosphere. Dry carbon dioxide was bubbled into the reaction vessel at room temperature and an exotherm increased the temperature to 45° C. to produce a thixotropic carbamate having the formula:

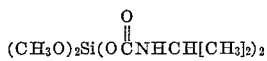
$$(CH_3O)_2Si(OCNHCH[CH_3]_2)_2$$

Four 100 part portions of a silanol chain-stopped dimethylpolysiloxane having a viscosity of 3500 centistokes at 25° C. were prepared and varying amounts of the dimethoxysilyl bis-carbamate were added. In particular, the bis-carbamate was added in amounts equal to 1.0 part, 1.5 parts, 2.5 parts, and 5.0 parts. The carbamate was thoroughly mixed with the diorganopolysiloxane and allowed to stand in an aluminum dish exposed to the atmosphere. The bis-carbamate was readily soluble in the polydiorganosiloxane at all levels, and no problem of solution occurred. Within several minutes, the viscosity of each reaction mixture began to increase and each mixture reached a tack-free state in a time which was a function of the amount of the carbamate added. The time varied from about 20 minutes for the solution containing 5.0 parts of the bis-carbamate to about 2 hours for the solution containing 1.0 part. Final cure of each mixture was also obtained in a time proportional to the amount of bis-carbamate added with the times varying from about 12 hours to 24 hours.

*Example 2*

To a reaction vessel containing 100 parts of the silanol chain-stopped dimethylpolysiloxane described in Example 1 was added 0.01 part tin octoate and 1 part of the bis-carbamate prepared from dimethoxydi(isopropylamino)-silane of Example 1. After thoroughly stirring this reaction mixture, a portion was poured into an aluminum dish to a thickness of ⅛″ and its cure rate was observed. This material cured to the tack-free state within about 15 minutes, and was thoroughly cured in about 12 hours.

*Example 3*

To a reaction vessel protected from the atmosphere was charged 20 parts of diethoxydi(isopropylamino)silane and the reaction vessel was cooled to 5° C. Dry carbon dioxide was then bubbled into the reaction vessel and the temperature rose to 10° C. The reaction mixture was held at 10° C. until absorption of carbon dioxide ceased, at which time the product had become thick and pasty and consisted of a carbamate having the formula:

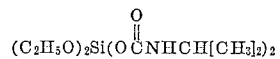
$$(C_2H_5O)_2Si(OCNHCH[CH_3]_2)_2$$

Under anhydrous conditions, two reaction mixtures were prepared from 100 parts each of the silanol chain-stopped dimethylpolysiloxane of Example 1 and 1.0 and 2.5 parts of the carbamate. Portions of each of these reaction mixtures were poured into an aluminum dish to a depth of ⅛″ and their cure progress was observed. Both rubbers became tack-free within about 2 hours and were cured to a soft silicone rubber which firmly adhered to the aluminum dish within about 24 hours.

*Example 4*

To 100 parts of the silanol chain-stopped dimethylpolysiloxane of Example 1 was added 0.01 part of stannous octoate and 1 part of the alkoxysilyl carbamate of Example 3. Within 30 minutes, a portion of this material poured into an aluminum dish had become tack-free and cure had been obtained within 16 hours, resulting in a clear, soft silicone rubber firmly affixed to the surface of the aluminum dish.

*Example 5*

To a reaction vessel isolated from the atmosphere was added 20 parts of t-butoxytri(isopropylamino)silane. The reaction mixture was held at a temperature of 5 to 10° C. while dry carbon dioxide was bubbled into the reaction mixture. Carbon dioxide feed was discontinued after carbon dioxide absorption ceased and the product was a white, pasty material having the formula:

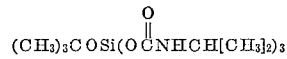
$$(CH_3)_3COSi(OCNHCH[CH_3]_2)_3$$

Under anhydrous conditions, 2.5 parts of this alkoxysilyl carbamate was added to 100 parts of the silanol chain-stopped dimethylpolysiloxane of Example 1 and a portion of this mixture was immediately poured into an aluminum dish to a depth of ⅛″ and exposed to moisture in the atmosphere. Within about 1 hour, this material had become tack-free, and was completely cured and adhered to the aluminum dish at the end of 24 hours.

*Example 6*

An alkoxysilyl carbamate having the formula:

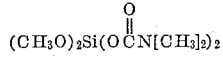
$$(CH_3O)_2Si(OCN[CH_3]_2)_2$$

is prepared by bubbling carbon dioxide into a reaction vessel containing dimethoxydi(dimethylamino)silane. Then 2.5 parts of the resulting alkoxysilyl carbamate are added to 100 parts of a silanol chain-stopped copolymer of 6 mole percent diphenylsiloxane units and 94 mole percent dimethylsiloxane units which has a viscosity of 100,000 centistokes at 25° C. By the end of one hour, a portion of this solution which is poured to a depth of ¼″ in an aluminum dish will have become tack-free and within 24 hours the material in the dish will have cured throughout its entire cross section and adhered rigidly to the surface of the dish.

What I claim as new and desire to secure by Letters Patent of the United States is:

1. A composition which is stable under anhydrous conditions but which is curable to the solid, elastic state upon exposure to moisture which comprises an alkoxysilyl carbamate having the formula:

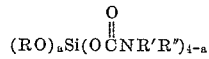
$$(RO)_aSi(OCNR'R'')_{4-a}$$

and a liquid silanol chain-stopped polydiorganosiloxane having the formula:

$$HO[(Y)_2SiO]_nH$$

where R and R' are lower alkyl radicals, R'' is a member selected from the class consisting of hydrogen and lower alkyl radicals, Y is a member selected from the class consisting of monovalent hydrocarbon radicals, halogenated monovalent hydrocarbon radicals and cyanoalkyl radicals, $a$ is a whole number equal to from 1 to 2, inclusive; and $n$ has a value of at least 10.

2. A composition of claim 1 in which the alkoxysilyl carbamate has the formula:

$$(CH_3O)_2Si(O\overset{O}{\underset{\|}{C}}NHCH[CH_3]_2)_2$$

3. A composition of claim 1 in which the alkoxysilyl carbamate has the formula:

$$(C_2H_5O)_2Si(O\overset{O}{\underset{\|}{C}}NHCH[CH_3]_2)_2$$

4. A composition of claim 1 in which the alkoxysilyl carbamate has the formula:

$$(CH_3)_3COSi(O\overset{O}{\underset{\|}{C}}NHCH[CH_3]_2)_3$$

5. A composition of claim 1 in which Y is methyl.

6. A composition of claim 1 in which the polydiorganosiloxane has a viscosity of from 100 centistokes to 100,000 centistokes at 25° C.

7. A composition of claim 1 in which the alkoxysilyl carbamate is present in an amount equal to from about 1.0 to 5.0 percent by weight, based on the weight of said polydiorganosiloxane.

References Cited

UNITED STATES PATENTS 3,284,485  11/1966  Goossens.

JAMES A. SEIDLECK, *Primary Examiner.*

M. MARQUIS, *Assistant Examiner.*